United States Patent
Guesnon et al.

(10) Patent No.: US 6,550,814 B2
(45) Date of Patent: Apr. 22, 2003

(54) HIGH-PRESSURE PIPE ELEMENT CONSISTING OF HOOPED TUBE SECTIONS

(75) Inventors: Jean Guesnon, Chatou (FR); Christian Gaillard, Rueil Malmaison (FR); Gérard Papon, Les Essarts-le-Roi (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 10/202,087

(22) Filed: Jul. 25, 2002

(65) Prior Publication Data

US 2003/0025324 A1 Feb. 6, 2003

(30) Foreign Application Priority Data

Aug. 1, 2001 (FR) .............................. 01 10361

(51) Int. Cl.⁷ ................................................ F16L 55/00
(52) U.S. Cl. ............................. 285/81; 285/90; 285/91; 285/92; 285/333
(58) Field of Search ................... 285/81, 90, 91, 285/92, 333, 390, 404

(56) References Cited

U.S. PATENT DOCUMENTS

| | | | |
|---|---|---|---|
| 3,114,566 A | | 12/1963 | Barton |
| 3,122,383 A | * | 2/1964 | Hirsch ........................ 285/397 |
| 3,126,214 A | | 3/1964 | Wong |
| 3,495,853 A | * | 2/1970 | Furrer .......................... 285/81 |
| 3,559,693 A | * | 2/1971 | Reynard et al. ............. 138/133 |
| 3,701,550 A | * | 10/1972 | Jacobson ...................... 285/39 |
| 3,863,959 A | * | 2/1975 | Blaschke ...................... 285/24 |
| 4,107,452 A | * | 8/1978 | Razvi ........................ 174/84 S |
| 4,159,132 A | * | 6/1979 | Hitz ............................. 285/39 |
| 4,478,434 A | * | 10/1984 | Little ........................... 285/15 |
| 4,610,465 A | * | 9/1986 | Boyadjieff ..................... 285/3 |
| 4,722,717 A | * | 2/1988 | Salzman et al. ............. 464/181 |
| 4,907,828 A | * | 3/1990 | Chang .......................... 285/24 |
| 5,168,943 A | * | 12/1992 | Falgout, Sr. ................. 175/74 |
| 5,201,550 A | * | 4/1993 | Burkit ........................ 285/109 |
| 5,355,908 A | * | 10/1994 | Berger et al. .......... 137/614.04 |
| 5,470,111 A | * | 11/1995 | Nelson et al. ................ 285/55 |
| 5,480,196 A | * | 1/1996 | Adams, Jr. .................. 285/369 |
| 6,050,609 A | * | 4/2000 | Boscaljon et al. ............ 285/81 |

FOREIGN PATENT DOCUMENTS

WO  9104433  4/1991

* cited by examiner

Primary Examiner—Eric K. Nicholson
Assistant Examiner—James M. Hewitt
(74) Attorney, Agent, or Firm—Antonelli, Terry, Stout & Kraus, LLP

(57) ABSTRACT

A high-pressure pipe element having hooped tube sections for making lines referred to as kill lines and choke lines that equip oil drilling installations, notably offshore. The element includes several hooped tube sections (51 to 56) connected by connecting parts (3).

6 Claims, 2 Drawing Sheets

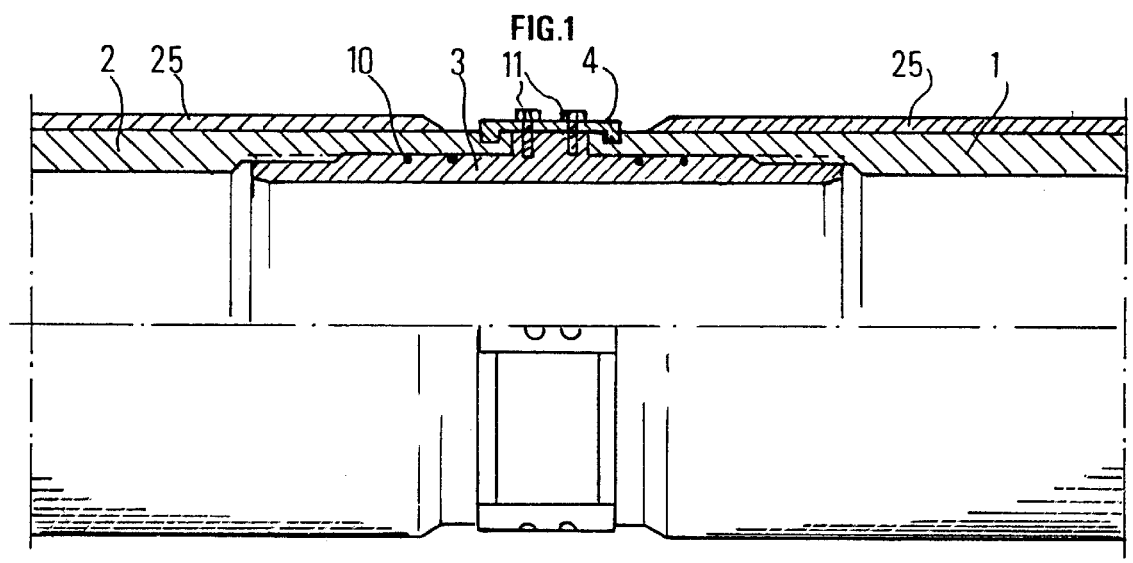
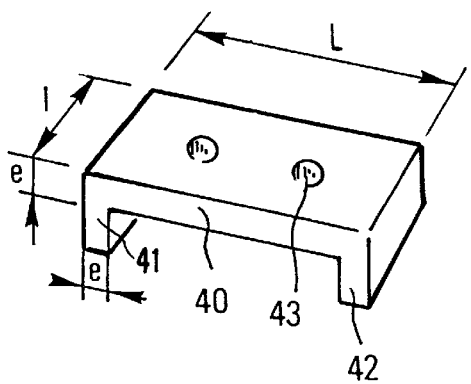
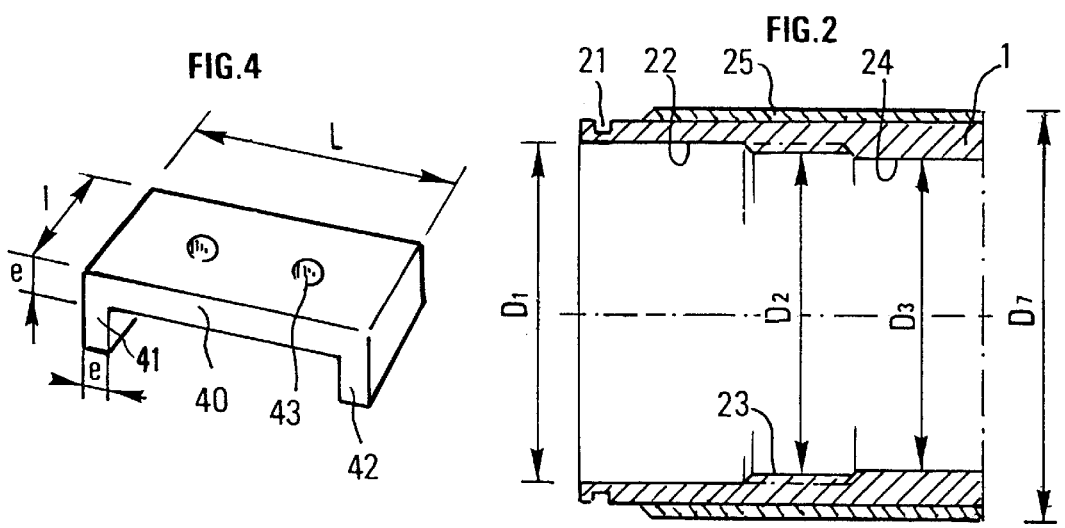
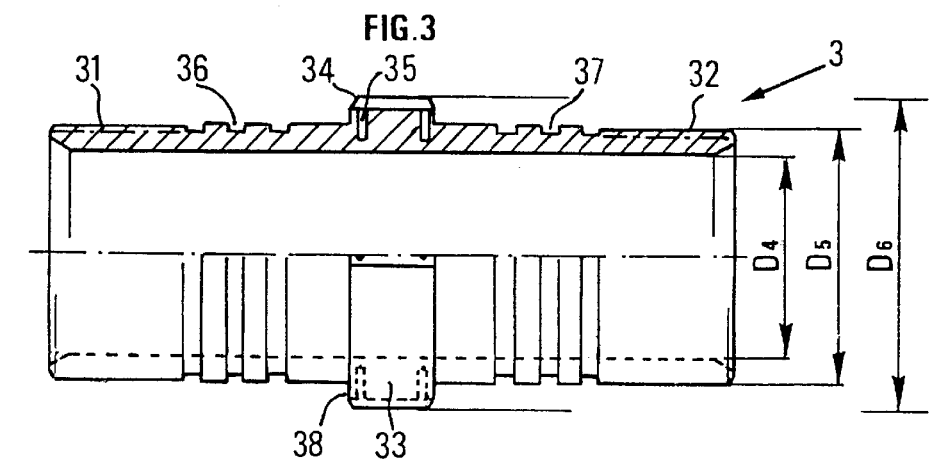

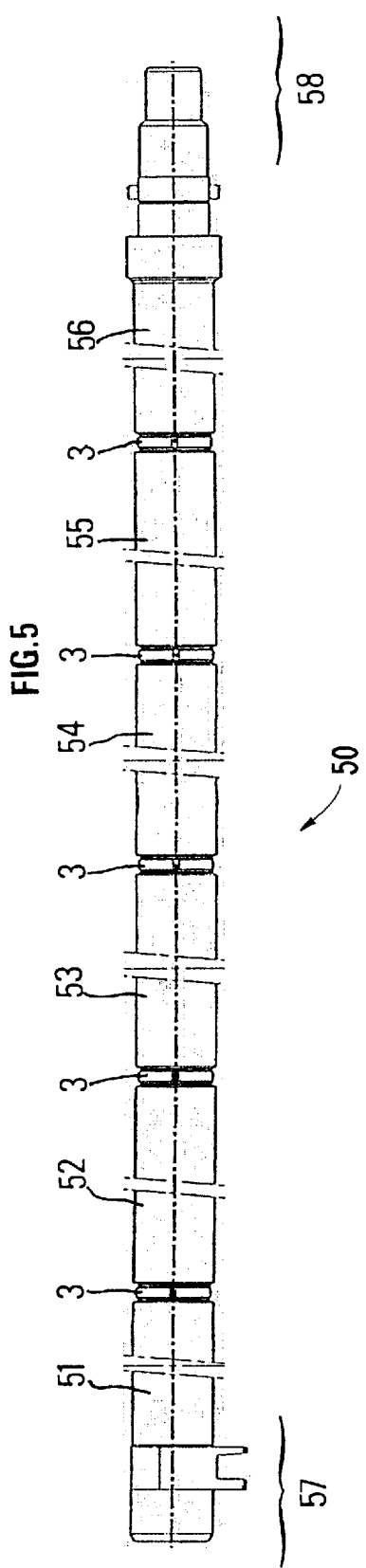

HIGH-PRESSURE PIPE ELEMENT CONSISTING OF HOOPED TUBE SECTIONS

FIELD OF THE INVENTION

The present invention relates to the sphere of high-pressure pipes intended to equip an oil well or an oil drilling and/or production installation, notably offshore.

BACKGROUND OF THE INVENTION

Oil is produced from an offshore reservoir using a pipe generally referred to as riser, which allows the wellhead installed at the sea bottom to be connected to the sea surface. The riser is an extension of the tubing carrying the oil from the well bottom to the wellhead. The riser is provided with at least two auxiliary lines called kill line and choke line, whose main function is to establish a hydraulic connection between the sea surface and the wellhead at the sea bottom. More particularly, these auxiliary lines allow to supply the well with fluid by circulating below the closed blowout preventer, and/or to discharge a fluid from the well, without passing through the inside of the riser. The fluid conveyed, resulting from an influx in an underground reservoir, can circulate at a pressure of 700 bars.

In general, the auxiliary lines and the riser are each made from an assembly of tube elements. In order to minimize the number of connections on a riser, the greatest possible tube element length is selected. However, tube handling operations, notably upon mounting an d dismantling of the riser, require limitation of the tubes length to an interval ranging between about 20 and 30 metres. In order to be able to readily and simultaneously carry out mounting of the riser and of the auxiliary lines, the length of the tubes that make up the auxiliary lines is substantially equal to the length of the tubes that make up the riser, i.e. a length ranging between about 20 and 30 metres.

The present invention proposes making auxiliary lines from a pipe element assembly consisting of hooped tubes so as to reduce the weight to which the riser is subjected. However, hooping of an at least 20-m long pipe element requires bulky, sophisticated and therefore expensive machines.

The present invention therefore proposes making an auxiliary line element from an assembly of several hooped tube sections, each pipe element having a length approximately greater than or equal to 20 metres. In particular, the invention provides an embodiment for connection means between the hooped tube sections allowing to obtain an approximately 20-m long pipe element.

SUMMARY OF THE INVENTION

The present invention thus relates to a high-pressure pipe element comprising at least two hooped tube sections connected by connection means that meet the mechanical strength and pressure resistance requirements relative to a hooped tube section.

The connection means can comprise an intermediate part screwed between the two sections, seal means, locking means for fastening the sections on said intermediate part.

The intermediate connecting part can be a tube whose outside diameter is smaller than or at most equal to the outside diameter of the hooped tube sections.

The locking means comprise at least one U-shaped part intended to block any longitudinal play between the sections and the intermediate part. Each edge of the U-shaped part can be inserted in a groove machined around each end of a hooped tube section, and the U can be fastened to the intermediate connecting part by the bottom of the U.

The pipe element according to the present invention can consist of four approximately 4-m long sections and of two approximately 2.5-m long sections.

The pipe element according to the present invention can be used to make an auxiliary line of a drilling riser, and the auxiliary line can be a kill line, a choke line, a booster line or a mud return line.

BRIEF DESCRIPTION OF THE DRAWINGS

Other features and advantages of the invention will be clear from reading the description hereafter of a non limitative embodiment example, with reference to the accompanying drawings wherein:

FIG. 1 diagrammatically shows a partial cross-sectional view of a connection between two hooped tubes, FIG. 2 is a cross-sectional view of an end of a hooped tube, FIG. 3 shows an intermediate connecting part, FIG. 4 is a perspective view of a U-shaped fastening means, FIG. 5 shows a pipe element consisting of hooped tubes connected according to the invention.

DETAILED DESCRIPTION

FIG. 1 shows the connection means of a pipe element according to the invention. The pipe element according to the invention consists of at least two hooped tubes 1 and 2 connected by means of an intermediate connecting part 3 and of U-shaped locking means or pipe bracket 4.

FIG. 2 shows the identical end of hooped tubes 1 and 2 which cooperates with intermediate connecting part 3. The outer surface of the tube end comprises a groove 21, or slot, machined perpendicular to the axis of the tube. Starting from the end of the tube, the inner surface of the tube comprises a first smooth surface 22 followed by a thread 23 ending in bore 24. Inside diameter $D_2$ of the tube, in the vicinity of the thread, is smaller than diameter $D_1$ in the vicinity of smooth surface 22. Inside diameter $D_3$ of the tube in the vicinity of surface 24 is generally smaller than or equal to diameter $D_2$ in the vicinity of thread 23. Reinforcing elements can be wound around the outer surface of tubes 1 and 2, except around groove 21, so as to form hooping layer 25. The outer surface of hooping layer 25 can be a cylinder of diameter $D_7$.

The connecting principle consists in using an intermediate part screwed onto the two ends of the hooped tubes with a sealing function and locking means for fastening the three parts together. The walls of the three parts have to be such that they meet the mechanical requirements, notably the internal pressure resistance.

FIG. 3 shows intermediate connecting part 3. Connecting part 3 is a tube of inside diameter $D_4$ and of outside diameter $D_5$, and it comprises a central collar or shoulder 33 of diameter $D_6$. Connecting part 3 stretches for example over an axial length of about 330 mm. Outside diameter $D_5$ is substantially equal to or slightly smaller than inside diameter $D_1$ of the end of tube 1 or 2 in the vicinity of first smooth surface 22. Threads 31 and 32 are machined on the outer surface at both ends of connecting part 3. The outside diameter of part 3 in the vicinity of threads 31 and 32 and the characteristics of threads 31 and 32 are so selected that threads 31 and 32 can respectively cooperate with box threads 23 of tubes 1 and 2. At the centre of connecting part 3, the outer surface of the tube comprises a shoulder 33, i.e. a part in the middle of connecting element 3 has an outside diameter $D_6$ that is larger than diameter $D_5$ of connecting part 3. The diameter $D_6$ of shoulder 33 is substantially constant. The shoulder can for example stretch over an axial length of about 40 mm. At each axial end of shoulder 33, a wall 38 connects the outer surface of shoulder 33 of diameter $D_6$ to the tube of diameter $D_5$. The two walls 38 can be substantially perpendicular to the axis of connecting part 3. On the outer surface of shoulder 33, grooves 34 are machined parallel to the axis of connecting part 3. Connecting part 3 can for example comprise four grooves 34 evenly distributed on the outer circumference of shoulder 33. At the bottom of each groove 34, two blind holes 35 are pierced in the radial direction of connecting part 3. Holes 35 are tapped. On the outer surface of connecting part 3, two slots 36 are machined between shoulder 33 and thread 31, and two slots 37 are machined between shoulder 33 and thread 32.

FIG. 4 shows a locking means in form of a pipe bracket 4. The bracket is U-shaped, i.e. a bracket 4 consists of a base 40 (which forms the bottom of the U) and of two legs, or edges, 41 and 42 (which form the two free branches of the U). Base 40 has the shape of a plate of width l, of length L and of thickness e. Legs 41 and 42 form, in a perpendicular direction, the extension of base 40 in the direction of its length. Thus, legs 41 and 42 can have a thickness and a width substantially equal to thickness e and width l of base 40. The thickness e of base 40 is pierced with two holes 43. Preferably, width l of bracket 4 is selected substantially equal to the width of grooves 34 of connecting element 3. Thickness e of legs 41 and 42 is preferably selected substantially equal to the width of grooves 21 of tubes 1 and 2.

With reference to FIG. 1, connection of hooped tubes 1 and 2 by means of intermediate connecting part 3 and of brackets 4 is carried out as follows:

- a seal means 10 is arranged in each slot 36 of connecting part 3. Seal means 10 can be, for example, doughnut rings made from an elastomer. Other types of composite joints can also be used;
- intermediate connecting part 3 is screwed on in the end of tube 1. Pin thread 31 of connecting element 3 is screwed onto box thread 23 of tube 1. Connecting part 3 can be screwed on in the end of tube 1 until the end of tube 1 rests against a wall 38 of shoulder 33 of connecting element 3. Connecting part 3 being screwed in the end of tube 1, surface 22 of tube 1 faces slots 36 comprising seal means 10 so that the link between tube 1 and intermediate connecting part 3 is sealed;
- a seal means 10 is arranged in each slot 37 of intermediate connecting part 3;
- the end of tube 2 is screwed onto connecting part 3. Pin thread 32 of connecting part 3 is screwed onto box thread 23 of tube 2. Tube 2 can be screwed onto connecting element 3 until the end of tube 2 rests against a wall 38 of shoulder 33 of connecting part 3. The end of tube 2 being screwed on connecting part 3, surface 22 of tube 2 faces slots 37 comprising seal means 10 so that the link between intermediate connecting part 3 and tube 2 is sealed;
- brackets 4 are placed in grooves 34. Legs 41 and 42 respectively fit into grooves 21 of tubes 1 and 2. Thus, brackets 4 prevent axial displacement of each tube 1 and 2 in relation to intermediate part 3, and consequently prevent the assembly from unscrewing;
- screws 11 are inserted into each hole 43 of brackets 4 and each thread 35 of connecting part 3 so as to hold brackets 4 in grooves 34, and legs 41 and 42 in grooves 21 (in FIG. 1, only one screw 11 is shown).

Connection can be performed without applying a makeup torque when screwing tubes 1 and 2 onto connecting element 3. Tubes 1 and 2 resting against connecting element 3 and installing brackets 4 can be sufficient to provide the connection.

Preferably, the geometry of tubes 1, 2, of intermediate connecting part 3, of brackets 4, diameter $D_6$ of the outer surface of shoulder 33 and thickness e of brackets 4 are so selected that the connection according to the present invention is inscribed in a cylinder of diameter $D_7$ (diameter $D_7$ being the outside diameter of hooping layer 25). Thus, the hooped tubes connected according to the present invention can be used without taking account of the connection. In particular, this feature is advantageous for storing pipe elements made of connected hooped tubes because the bearing surfaces are on the hooped lengths and not localized on the connections.

In FIG. 5, the inside diameter of connecting zones 57 and 58 at the ends of a pipe element can be smaller than the inside diameter of tubes 51 to 56. Preferably, inside diameter $D_4$ of connecting part 3 is so selected as to be larger than the smallest inside diameter of the connecting zones.

The connecting means are so designed that the mechanical strength of the pipe element is at least equal to the strength of a hooped tube section. Furthermore, the resistance to the internal pressure, the working pressure, the test pressure, or the burst pressure of the pipe element made of hooped tube sections is identical or at least equal to the pressure resistance of a hooped tube section. It is clear that, for these conditions to be met, the inside diameter of the intermediate part is slightly smaller than the inside diameter of a hooped tube section. But the length of the intermediate part is short in relation to the length of a hooped tube section, which does practically not increase the pressure drops during circulation.

FIG. 5 shows a pipe element made of hooped tubes 50 according to the invention. The element consists of six sections 51 to 56. Sections 51 to 56 are hooped tubes. The length of four of the six hooped tubes 51 to 56 is about 4 metres. The length of two of the six hooped tubes 51 to 56 is about 2.5 metres. The pipe element according to the invention stretches over a length of about 21 metres. Hooped tube sections 51 to 56 are connected by means of intermediate connecting parts 3 described above. Section 51 at one end of pipe element 50 has a connecting zone 57 which can cooperate with connecting zone 58 of section 56 at the other end of another pipe element 50.

What is claimed is:

1. A high-pressure pipe element, wherein said element comprises at least two hooped tube sections connected by connecting means that meet mechanical strength and pressure resistance requirements for said at least two hooped tube sections, wherein said connecting means comprise an intermediate connecting part screwed between the at least two hooped tube sections, sealing means and locking means for fastening the at least two hooped tube sections on said intermediate connecting part, wherein said locking means comprise at least one U-shaped part so as to block any longitudinal play between the at least two hooped tube sections and the intermediate connecting part, wherein said at least one U-shaped part includes a base and two distinct legs extending from the base.

2. A high-pressure pipe element as claimed in claim 1, wherein said intermediate connecting part is a tube whose outside diameter is smaller than or at most equal to the outside diameter of the at least two hooped tube sections.

3. A high-pressure pipe element as claimed in claim 1, wherein each leg of the at least one U-shaped part is inserted in a groove machined around each end of the at least two hooped tube sections, and said at least one U-shaped part is fastened to the intermediate connecting part by the base of the at least one U-shaped part.

4. A high-pressure pipe element as claimed in claim 1, consisting of four 4-m long sections and of two 2.5-m long sections.

5. A high-pressure pipe element as claimed in claim 1, said element being used in an auxiliary line of a drilling riser.

6. A high-pressure pipe element claimed in claim 5, wherein said auxiliary line is one of the following lines: kill line, choke line, booster line and mud return line.

* * * * *